Nov. 5, 1963 T. BARRETT ETAL 3,109,658
VISCOSITY GROOVE TYPE SHAFT SEAL
Filed Feb. 4, 1958 3 Sheets-Sheet 2

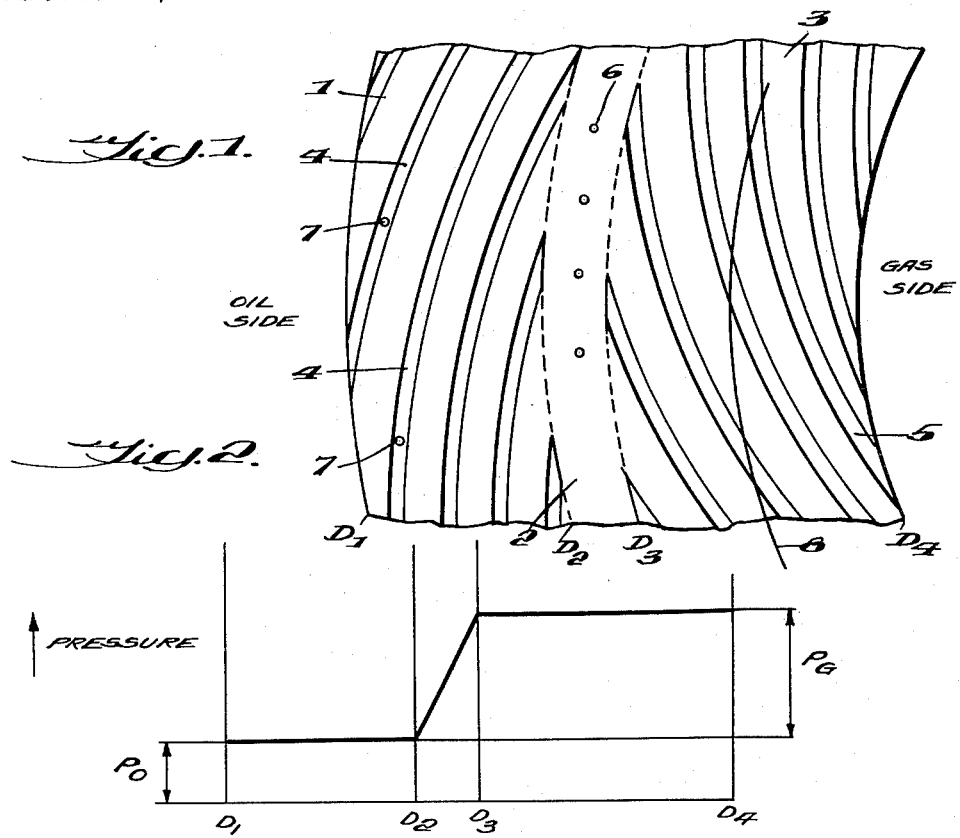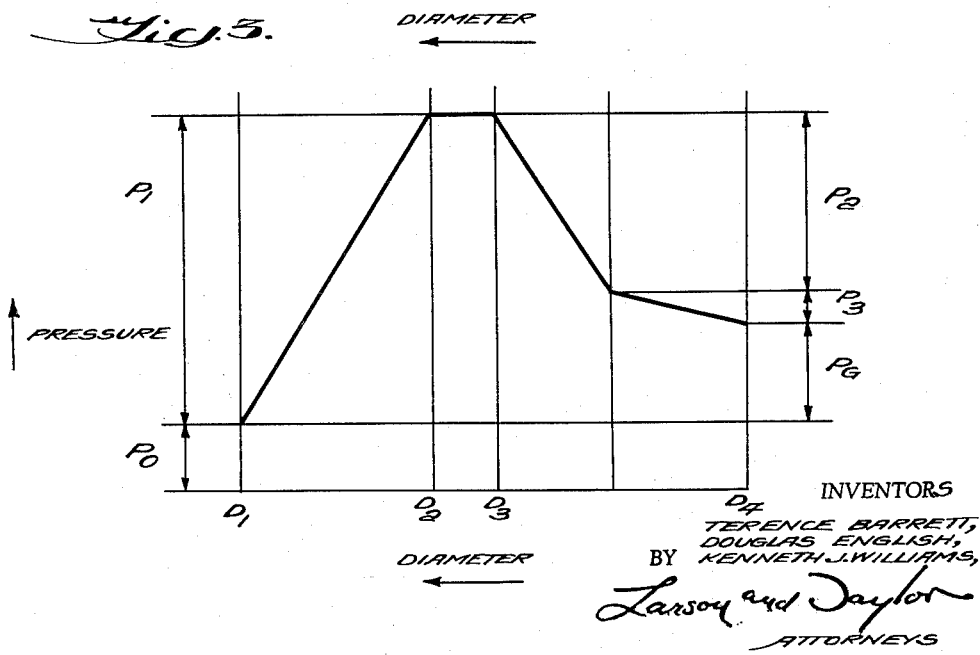

INVENTORS
TERENCE BARRETT,
DOUGLAS ENGLISH,
KENNETH J. WILLIAMS,
BY
Larson and Taylor
ATTORNEYS Nov. 5, 1963    T. BARRETT ETAL    3,109,658
VISCOSITY GROOVE TYPE SHAFT SEAL
Filed Feb. 4, 1958    3 Sheets-Sheet 3

INVENTORS
TERENCE BARRETT,
DOUGLAS ENGLISH,
BY KENNETH J. WILLIAMS,

Larson and Taylor
ATTORNEYS

United States Patent Office 3,109,658
Patented Nov. 5, 1963

3,109,658
VISCOSITY GROOVE TYPE SHAFT SEAL
Terence Barrett, Wantage, Douglas English, Abingdon, and Kenneth John Williams, Goring-on-Thames, England, assignors to The United Kingdom Atomic Energy Authority, London, England
Filed Feb. 4, 1958, Ser. No. 713,267
Claims priority, application Great Britain Feb. 4, 1957
3 Claims. (Cl. 277—3)

This invention relates to shaft seals of the viscosity groove type and is concerned with effecting a seal against gas under pressure by means of oil.

According to the present invention in a shaft seal of the viscosity groove type in which a seal is effected by liquid under pressure between two smooth surfaced members arranged face to face, two series of viscosity grooves separated by a continuous ungrooved surface are arranged to generate said pressure, the series on the gas pressure side of the seal being arranged to generate a greater liquid pressure than the other series so that a gas liquid interface is set up in the former series.

The invention may be applied either to a plate or to a cylindrical type seal.

As applied to a plate type seal the invention may comprise two smooth surfaced annular plates arranged face-to-face, the surface of one of said plates having formed therein a series of oppositely inclined viscosity grooves extending respectively over two spaced concentric bands, the comparative radial widths of the bands being such that the series on the gas pressure side of the seal generates the greater pressure at the surface between the bands, means for supplying a liquid, such as oil, to the other series and means for axially loading said plates.

It will be appreciated that in a plate type seal as distinct from a cylindrical seal the pressure generated is a function of the mean radius of each band and that other factors, such as the band width and groove shape, being equal, the outer series generates the greater pressure. This difference in radii is therefore taken into consideration in determining the comparative band widths.

The pressure difference may however be obtained other than by varying the widths of the respective bands by choosing, for example, an optimum groove depth (as hereinafter described) for the series required to generate the greater pressure and a non-optimum depth for the other series.

Figure 4:
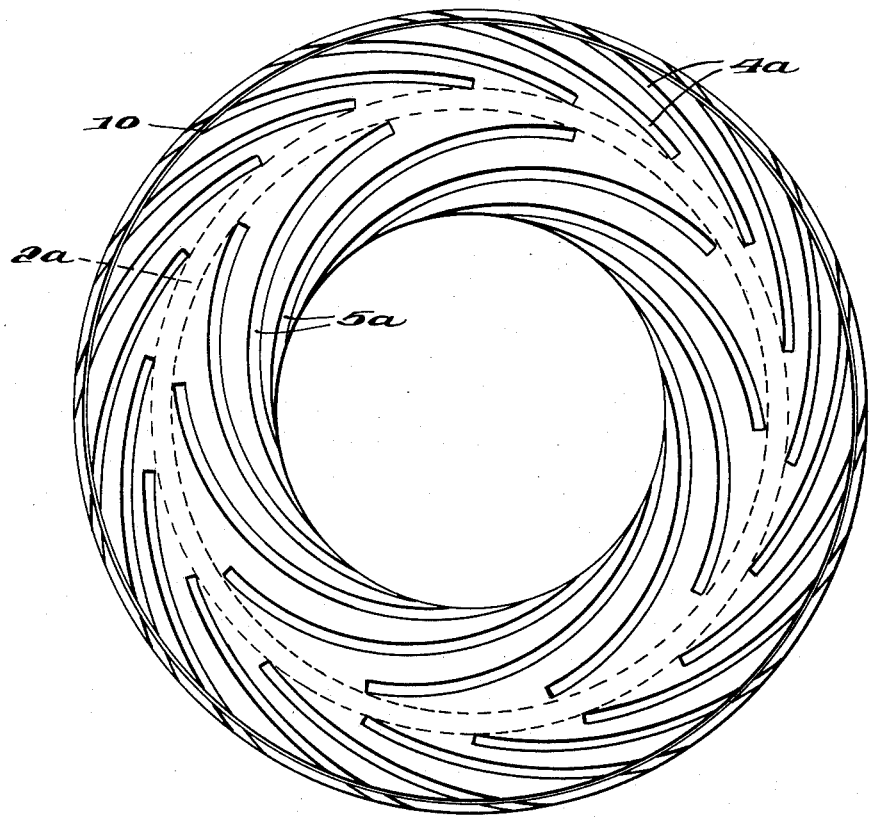
Figure 5:
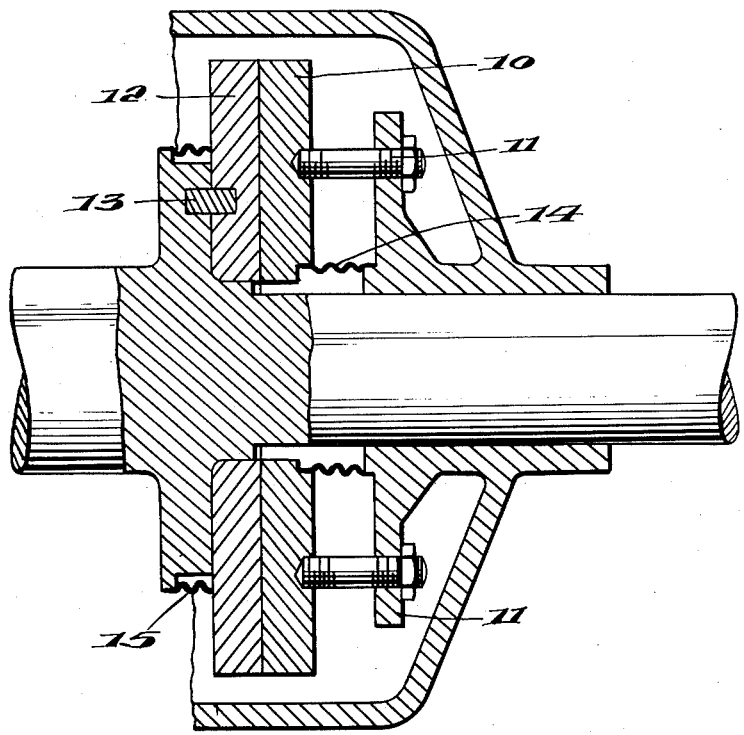

One embodiment of the invention will now be described by way of example with reference to the accompanying drawing in which:

FIG. 1 is a face view of a short sector of the grooved annular plate of a viscosity plate gland in accordance with the invention, FIGS. 2 and 3 are static and dynamic pressure distribution diagrams for the plate of FIG. 1, and FIG. 4 is a face view of a slightly modified form of viscosity plate, FIG. 4 is a face view of the grooved annular plate, and FIG. 5 is a sectional view showing the mounting of the viscosity plate gland.

The fragment shown in FIG. 1 is typical of the remainder of the annular plate of which it is a part and is characterised by three radial bands designated 1, 2 and 3 and respectively defined between diameters $D_1-D_2$, $D_2-D_3$ and $D_3-D_4$ of the plate, grooves being provided within bands 1 and 3. This grooved working face is arranged to be in spring loaded face contact with a smooth surfaced ungrooved plate, the ungrooved plate being arranged to be driven by a rotating member and the grooved plate being attached to a fixed casing part.

The grooves consist of two spiral series of opposite sense, a wide series of grooves 5 in the wide inner band 3 adjacent the gas or pressure side of the gland and a narrow series of grooves 4 in the narrow outer band 1 adjacent the other or oil side of the gland. The much narrower band 2 between the bands 1 and 3 is a continuous land which provides an effective seal when the parts are stationary. The pressure distribution along a radius of the plate under these conditions is shown in FIG. 2, the gas to be sealed being at static pressure $P_G$ greater than that of the oil, $P_0$. The grooves 4 are filled with oil and the grooves 5 with gas and the pressure difference $P_G - P_0$ is accommodated by the band 2 across which it falls off linearly.

At intervals along the band 2 are oil feed holes 6 to which oil may be fed under pressure to enable the plates to be jacked apart against the spring loading for starting purposes. Alternatively, means may be provided for relieving the spring loading during start-up.

The sense of the spirals is such that for the normal direction of rotation of the said rotating member viscous drag in the grooves 4 and 5 builds up opposing gas and oil pressures at the band 2.

Oil is fed to the oil grooves 4 by means of oil feed holes 7. In operation, oil is forced from band 1 across band 2 to band 3, and under equilibrium conditions a gas/oil interface indicated at 8 appears in the gas grooves 5 in band 3 (FIG. 1). By suitable selection of the design parameters the interface can be arranged to occur in the gas grooves 5 close to the band 2 in which position it can be shown that there is minimum friction between the plates.

The pressure distribution under running conditions is shown in FIG. 3. Oil pressure $P_1$ generated in the oil grooves 4 is seen to balance the sum of the oil pressure $P_2$ generated in the gas grooves 5, the gas pressure $P_3$ generated in the gas grooves 5 and the static gas pressure $P_G$.

In order that gas shall not leak out it is necessary that $$P_1 > P_G + P_3 \text{ max.}$$

where $P_3$ max. is the pressure generated in the gas grooves when full of gas to diameter $D_3$ (FIG. 1).

The magnitude of $P_1$ is governed by the load on the plate due to the spring and static gas pressure.

If oil is not to leak inwards then:

$$P_1 < P_G + P_2 \text{ max.}$$

where $P_2$ max. is the pressure generated in the gas grooves 5 when completely full of oil to diameter $D_4$.

These conditions can be satisfied by appropriate choice of the groove band widths.

In one practical embodiment of the invention as applied to a plate type seal the ungrooved rotating plate is 8 in. outside diameter, 4 in. inside diameter and is made of hardened tool steel. The fixed grooved plate 10 shown in FIG. 5 is of the same dimensions and is made of a brass chromium plated to a thickness of 0.010 in. after grooving. The working face of each plate is ground and lapped flat to an accuracy of 2 to 3 fringes of sodium light. Neither plate is clamped, the fixed plate 10 is merely prevented from rotation by a peg 11. The rotating plate 12 is driven by a peg 13, a seal being effected between each plate and its associated mount by conventional flexible diaphragms or bellows 14 and 15, spring means being provided as shown to axially load the plates.

The continuous land 2a on the grooved plate extends from a radius of 3.00 in. to a radius of 3.244 in. The equally spaced outer grooves 4a are eighteen in number and each is an arc of a circle of 3.91 in. radius struck from a pitch circle of diameter 1.90 in. centred on the plate. The oppositely inclined inner grooves 5a are ten in number and each is an arc of a circle of 2.50 in. radius struck from a pitch circle of diameter 1.32 in. centred on the plate. They are equally spaced.

A circular oil feed groove 10 is provided close to the periphery of the plate which groove intersects the outer end of each of the outer grooves and is fed with oil from the back of the plate through an oil feed hole.

All the grooves are 0.120 in. wide and 0.0025 in. deep at their leading edges relative to the direction of rotation and taper linearly to zero depth at their trailing edges. The relative radial position of the inner and outer grooves which are oppositely inclined, is of no consequence.

The design is such that the groove widths are approximately equal to the groove spacing and the grooves are roughly at an angle of 75° to the tangential direction. The maximum groove depth (0.0025 in.) is 2.6 times the designed running clearance between the plates.

A shaft seal as described above was used to seal air at 125 p.s.i. gauge from the ambient air. The shaft was rotating at 400 r.p.m. and oil having a viscosity of 4.7 poises at 15° C. was supplied at the rate of ½ gallon per hour. The spring loading was adjusted within the range 2–3 tons to give the optimum clearance of 0.0008 in. for a groove depth of 0.0025 in.

Under these conditions the air leak rate across the seal was found to be as low as 4½ cubic in. N.T.P. per hour. The oil pressure generated by the grooves at the band was of the order of 500 p.s.i. gauge.

In applying the invention to a cylindrical type seal the running clearance cannot be adjusted and is therefore arranged ab initio to be the aforesaid optimum fraction of the groove depth.

We claim:

1. A shaft seal of the viscosity groove type in which a seal is effected by liquid under pressure comprising two smooth surfaced members arranged face-to-face, two series of viscosity grooves separated by a continuous ungrooved surface in one of said members, said grooves arranged to generate said pressure, the series on the gas pressure side of the seal being arranged to generate a greater liquid pressure than the other series so that a gas/liquid interface is set up in the first mentioned series.

2. A shaft seal comprising two smooth surfaced annular plates arranged face-to-face, the surface of one of said plates having formed therein a series of oppositely inclined viscosity grooves extending respectively over two spaced concentric bands, the comparative radial widths of the series being such that the series on the gas pressure side of the seal generates the greater pressure at the surface between the bands, means for supplying a liquid, such as oil, to the other series and means for axially loading said plates.

3. A shaft seal as claimed in claim 2 wherein said axial load is adjustable to give a running clearance between the plates of approximately $\frac{1}{2.6}$ the groove depth.

No references cited.